United States Patent [19]

Samford

[11] Patent Number: 4,871,892

[45] Date of Patent: Oct. 3, 1989

[54] COOKING UTENSIL USEFUL FOR ASSURING DESTRUCTION OF HARMFUL BACTERIA DURING MICROWAVE COOKING OF POULTRY AND OTHER FOODS

[75] Inventor: Dean A. Samford, Chrisman, Ill.

[73] Assignee: General Housewares Corporation, Stamford, Conn.

[21] Appl. No.: 288,465

[22] Filed: Dec. 22, 1988

[51] Int. Cl.[4] .............................................. H05B 6/80
[52] U.S. Cl. ...................... 219/10.55 E; 219/10.55 F; 99/DIG. 14; 426/243
[58] Field of Search .................. 219/10.55 E, 10.55 F, 219/10.55 D, 10.55 M, 10.55 R; 99/DIG. 14, 451; 426/243, 241, 234

[56] References Cited

U.S. PATENT DOCUMENTS

| | | | |
|---|---|---|---|
| 3,230,864 | 1/1966 | Krajewski | 99/DIG. 14 |
| 3,985,990 | 10/1976 | Levinson | 219/10.55 E |
| 4,080,524 | 3/1978 | Greenfield, Jr. et al. | 219/10.55 E |
| 4,140,889 | 2/1979 | Mason, Jr. et al. | 219/10.55 E |
| 4,268,738 | 5/1981 | Flautt, Jr. et al. | 219/10.55 F |
| 4,317,017 | 2/1982 | Bowen | 219/10.55 E |
| 4,345,133 | 8/1982 | Cherney et al. | 219/10.55 E |
| 4,481,392 | 11/1984 | Nibbe et al. | 219/10.55 E |
| 4,499,356 | 2/1985 | Hatagawa | 219/10.55 E |

Primary Examiner—Philip H. Leung
Attorney, Agent, or Firm—Haynes N. Johnson

[57] ABSTRACT

A microwave cooking utensil useful for assuring destruction of Salmonella or other harmful bacteria present in cooking liquids during the cooking of poultry including an outer container made of microwave reflective material, a microwave transmissive steam-confining cover enclosing the outer container, and an apertured rack for supporting, essentially in contact thereon, a food product. The rack is made of heat-conductive, microwave-reflective material and includes a support to hold the rack above the bottom surface of the container so that the rack and the bottom surface define a chamber to receive cooking liquids. The rack has a first set of apertures proximate to its periphery large enough, and with a total area large enough, to permit passage therethrough, during the normal poultry cooking cycle, of sufficient microwave energy to pasteurize any Salmonella bacteria present in the cooking liquids. The total area of the first set of apertures should be small enough, however, so that total microwave energy passing through them will not prevent condensation of steam in the chamber. The rack has an optional second set of apertures therein large enough to permit the passage of the cooking liquids and small enough to be substantially impermeable to microwave energy, so that cooking liquids are quickly removed from the vicinity of the food being cooked.

19 Claims, 2 Drawing Sheets

COOKING UTENSIL USEFUL FOR ASSURING DESTRUCTION OF HARMFUL BACTERIA DURING MICROWAVE COOKING OF POULTRY AND OTHER FOODS

FIELD OF THE INVENTION

This invention relates to the field of microwave cookery and, in particular, to a cooking vessel particularly well adapted for cooking poultry.

BACKGROUND OF THE INVENTION

According to published reports, a substantial percentage of raw chicken purchased in stores has been found to be infected with Salmonella bacteria. Salmonella is pathogenic for man and can produce a variety of uncomfortable symptoms ranging from mild to life-threatening.

Salmonella infected chicken (or other poultry) has not generally been regarded as a serious health problem in the past since the Salmonella bacteria is destroyed by neat pasteurization in the normal process of cooking the chicken. When cooking a chicken in a microwave oven, however, the chicken itself receives enough heat energy to achieve pasteurization, but the cooking juices sometimes do not. This occurs because cooking vessels may be used in which the cooking juices are collected in a chamber protected from microwaves, in order to save energy and to protect the juices from boiling or smoking. Such cooking vessels may prevent pasteurization of the juices and, so, be dangerous to health.

Various microwave cooking vessels, useful for this saving of energy, have been devised. These include, for example, those found in Krajewski U.S. Pat. Nos. 3,230,864, Levinson 3,985,990, and Eke 4,653,461.

In the Levinson patent a shielded chamber for the collection 10 of liquid by-products is integral to the vessel and results in more efficient functioning. Liquid by-products not so shielded would absorb relatively large amounts of microwave energy, resulting in extended cooking time and, ultimately, in the production of undesirable quantities of steam or smoke, or both.

The Krajewski patent discloses a cooking vessel in which the food is supported on an apertured, electrically conductive, partially insulated cover elevated above a container intended to capture liquid by-products. The Eke patent shows a trivet insulated from the oven turntable; it also provides a collection chamber.

The disclosures of these patents are directed to saving energy and/or prevention of smoke without addressing the problem of destroying Salmonella bacteria or other organisms harmful to human health. Yet, underheating as well as overheating of liquid by-products can be a problem in microwave cooking, particularly in the cooking of poultry.

My invention is aimed at addressing the problem of destroying Salmonella bacteria (or other bacteria which can be destroyed by pasteurization) while providing cooking efficiency and utility substantially equivalent to that which has been disclosed in the prior art.

RELATED APPLICATIONS

Levinson application, Ser. No. 201,606, filed June 3, 1988, on "Food Preparation Kit For Use In Cooking Food In Microwave Oven Or In Thermal Oven," owned by a common assignee, is related to the above Levinson patent. It is directed to a three-element food preparation kit having an imperforate metal outer container, an inner perforated metal rack carried by flanges on the upper rim of the outer container, and a microwave transmissive cover. The space between the container and rack serves as a liquid collection and steam condensation chamber. The outer container is preferably electrically and thermally insulated from the inner rack. The application does not, however, deal with protection against Salmonella or other harmful bacteria. To the contrary, it serves to prevent the pasteurization of bacteria that are in the cooking juices.

BRIEF SUMMARY OF THE INVENTION

A microwave cooking vessel is provided having an enamelled metal outer container, a microwave reflective, metal, inner rack, and a microwave transmissive cover. The upper surface of the rack supports food during cooking, and its periphery is a downwardly extending flange which complements and rests on the inner surface of the outer container.

The areas of contact between the rack and the outer container are electrically and thermally insulated from one another by a porcelain coating on either the inner surface of the container or on the rack flanges or both. As a result, the inner rack and the outer container together define a steam condensation and pasteurization chamber and, yet, are insulated from one another.

The rack covers substantially all of the bottom of the container. Optionally, it may have a microporous surface, i.e., a surface with a series of apertures large enough to permit the passage of cooking liquids, but too small to allow passage of microwaves.

The upper surface of the rack contains one or more apertures which are large enough to permit passage of microwave energy. The apertures have sufficient total area to pass enough microwave energy to the chamber, during the normal cooking cycle, to pasteurize the cooking juices and rendered fats stored below. The area is not so large, however, as to permit passage of so much energy as to cause undesirable boiling or smoking of the juices during the normal cooking cycle.

DETAILED DESCRIPTION OF THE INVENTION

Figure 1:
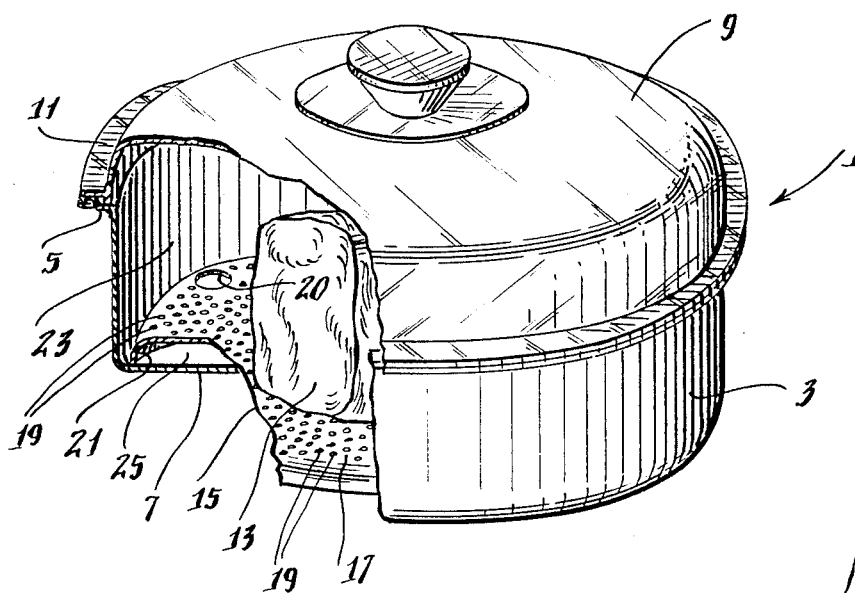
FIG. 1 is a perspective view of my cooking vessel, partially broken away the inner structure.

My microwave cooking vessel 1 is formed of three parts: a metal, microwave reflective, outer container 3, a steam-confining cover 9 made of microwave transmissive material such as glass, and a microwave reflective, food-supporting, apertured metal rack 15. Container 3 has an outer peripheral flange 5 to support a complementary flange 11 on the periphery of cover 9 so as to create a generally vapor-tight seal between the two.

Figure 5:
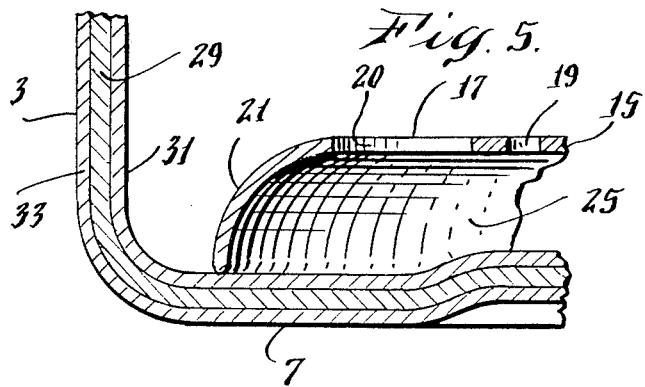
FIG. 5 is a section of a lower corner of my cooking vessel showing method of insulation.

In the preferred embodiment container 3 is made of porcelain enamelled steel. As shown in FIG. 5, it is formed of a steel layer 29 coated on the inner surface with porcelain 31 and on the outer surface with porcelain 33. This porcelain serves to provide not only thermal insulation, but also electrical insulation and so serves to inhibit sparking.

Figure 6:
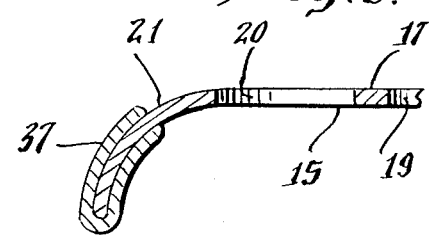
FIG. 6 is a section of one end of the rack, showing a modified method of insulation.

As a modification of the above, the insulation can be on the rack itself. As shown in FIG. 6, the supporting flange 21 of rack 15 can itself be coated with enamel 37. This can be in lieu of coating the container 3 or in addition to coating the container.

The metal rack 15 includes an upper food-supporting surface 17 for the food 13 and, extending from the periphery of surface 17, a downwardly extending lower flange 21. Flange 21 is complementary with and rests upon the inner surface 7 of container 3, thus making rack 15 self-sustaining over the bottom of container 3. Preferably, flange 21 extends about the entire periphery of surface 17, and rack 15 is of such size and shape that it covers substantially all of the inner (bottom) surface 7 of container 3. The food 13 to be cooked is supported by rack 15 and is in contact with surface 17.

The space above rack 15 and encompassed by container 3 and cover 9 is the cooking chamber 23. Preferably, its volume should exceed that of the chamber. The function of cooking chamber 23 is the same as that of the chamber described in Levinson U.S Pat. No. 3,985,990. That is, cooking chamber 23 receives microwave energy through cover 9 and passes it to the food 13, both directly and by multiple reflections from the inner sides of container 3 and surface 17 of rack 15.

Rack 15 and inner surface 7 define between them a partially microwave shielded chamber 25. This chamber receives cooking liquids and steam and shields them from microwave energy sufficient to induce and maintain boiling temperature. However, energy sufficient to raise the liquids to the lower temperature required for pasteurization is admitted to the chamber; thus safety of pasteurization and efficiency of condensation are both achieved.

Chamber 25 resembles the Levinson patent to the extent that it receives cooking juices and gases through holes 19. The gases condense in chamber 25 thereby releasing latent heat of vaporization and providing additional heat, returned through rack 15, by conduction, to aid in the cooking of the food.

Chamber 25 differs from Levinson in that it permits the juices to receive a carefully controlled amount of microwave energy. As a result, chamber 25 can serve the additional function of destroying (pasteurizing) the Salmonella or other bacteria. For this purpose, the periphery of the upper surface of the rack 15 includes one or more apertures 20 each of which is large enough and so shaped as to permit the passage of microwaves, steam and cooking juices, so that enough microwave energy can enter the chamber to pasteurize the juices, but not so much as to boil the liquid contained therein. The total area of apertures 20 should be large enough to permit enough microwave energy to pass into the chamber to pasteurize any Salmonella bacteria present in the cooking juices during and before completion of the normal cooking time for the chicken itself. The total area of these openings, however, should not be so large as to negate the other purpose of the chamber, i.e., protection of the juices from undesired excess of microwave energy.

Figure 2:
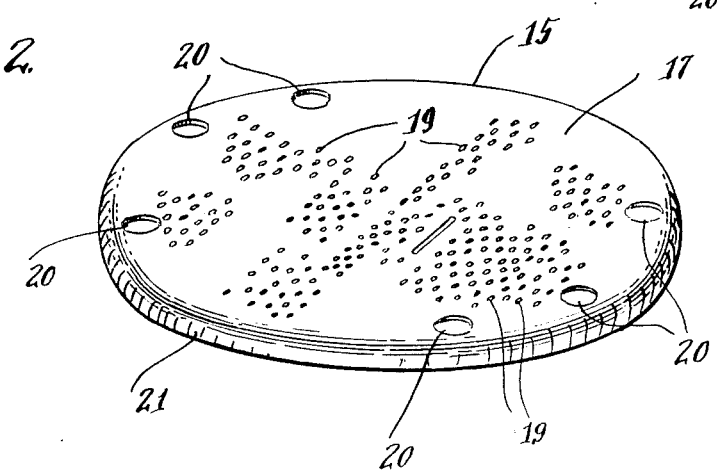
FIG. 2 is a perspective view of the inner rack used to support the food during cooking and, together with the bottom of the outer to provide a chamber.
Figure 3:
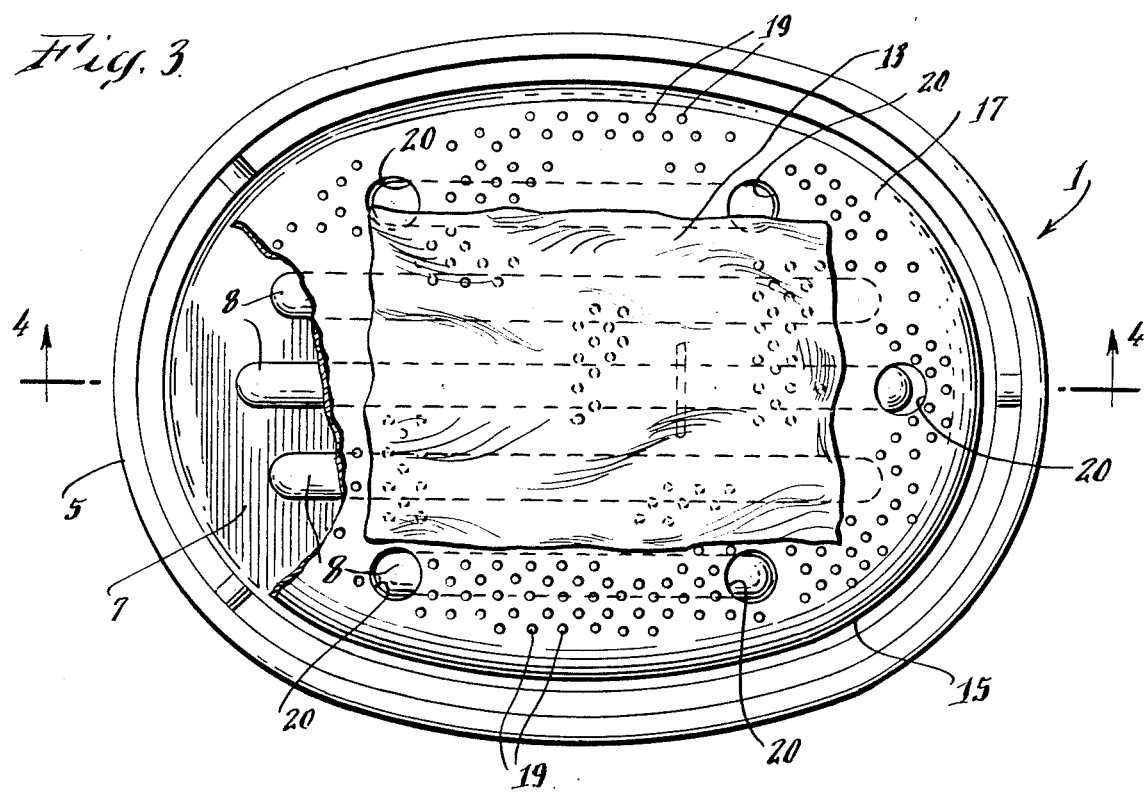
FIG. 3 is a plan top view of my cooking vessel, with the cover removed rack partially broken away.
Figure 4:
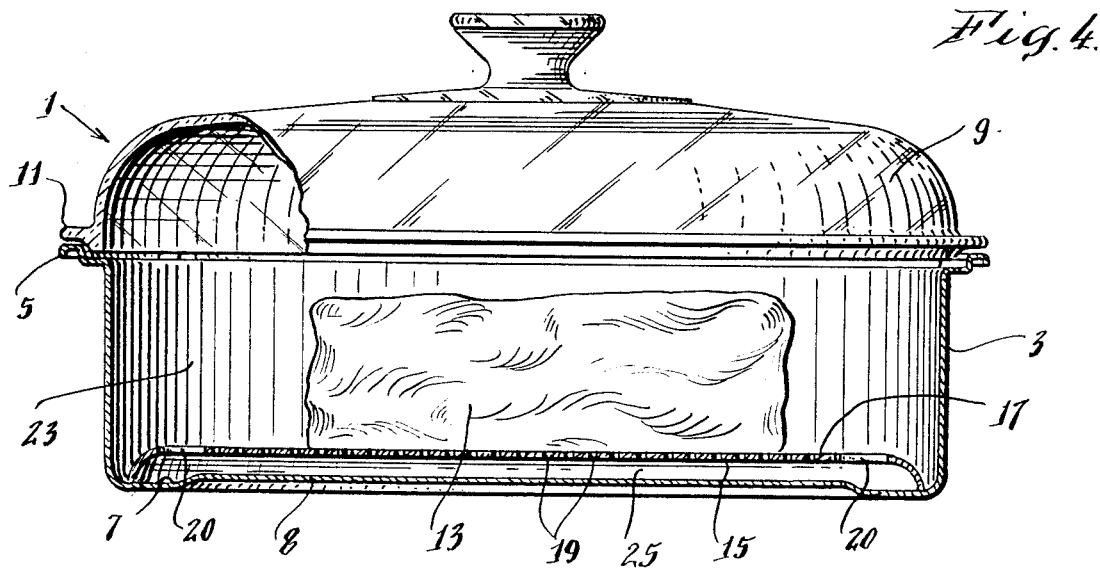
FIG. 4 is a side elevation of my cooking vessel, partially in section, the section being taken on line 4—4 of FIG. 3.

Tests have indicated that Salmonella bacteria found in chicken are killed (pasteurized) by exposure to 140° F. for 3.5 minutes. In the preferred embodiment, this is accomplished for a normal sized chicken (say, two ponds or more) in a household microwave oven with a power source of 600 to 750 watts if there are six round apertures 20 with a diameter of ⅜ inch each, i.e., with a total aperture area of about 2.65 square inches. These holes should be near the two ends of the rack (see FIG. 2) so that they are less likely to be blocked by the presence of the chicken being cooked.

Microwave ovens of significantly greater or lesser power would require apertures having a lesser or greater total area. The total area should be large enough so that sufficient microwave wave energy passes to the juices such that pasteurization takes place during the normal cooking time for the chicken, and not so much more as to either be wasteful of energy or to cause smoking or boiling of the juices.

Problems with microwave ovens having a smaller wattage (less than 600 watts) are readily overcome in two ways: First, if the cooking vessel is large enough, it will not fit into such a smaller, lower powered oven. Alternatively, the rack can be designed with sufficient area of apertures 20 to permit passage of sufficient energy to pasteurize the Salmonella bacteria, with the lesser wattage, during the normal cooking period. The amount of energy received by the liquids should be adequate to achieve pasteurization, but should not be so great as to prevent condensation or induce boiling or burning of the liquids in the chamber 25.

One system for determining the best number, shape, and size of the apertures 20 is to "tune" them. That is, one would determine experimentally the optimum size, shape and number of apertures for a given microwave generator having power within a given range of wattage and wavelength within a given range. These, then, would be tuned apertures.

The result of my design is that Salmonella bacteria present in the juices will be destroyed at least by the time the chicken or other food has been cooked.

It should be noted that some of the juices may first flow into the chamber after the chicken has been cooking for a period, or even when the chicken is almost completely cooked. These may not remain in the chamber for the full pasteurization period. Because these juices (like the food itself) have been receiving unrestricted microwave energy while in the cooking chamber 23, they will thus be heated to a sufficiently high temperature for enough total time (in the cooking and condensation chambers) to be fully pasteurized. Thus, the primary problem being solved by my invention is that of pasteurization of juices which liquified during the early part of the cooking cycle and which would, in the absence of my invention, have been protected by the chamber from thereafter receiving further microwave energy.

Surface 17 is optionally also covered by holes or perforations 19. Holes 19 are large enough to permit the passage of cooking liquids and gases, such as steam, but are small enough to prevent the passage of microwaves of the frequencies normally used for cooking. Normally, hole diameters of 1/16 to ⅜ inch will be suitable. Whether or not holes 19 are included, it is useful to have apertures 20 placed in depressions in surface 17 (See FIG. 7) for better drainage of the cooking liquids into chamber 25.

It will be noted that my rack structure accomplishes at least one purpose of the Levinson patent and the Levinson application without requiring a more costly and unwieldy container within a container configuration. It provides a partially shielded chamber for the collection of liquid by-products simply by having a flanged rack 15 resting on the inner surface 7 of container 3.

Figure 7:
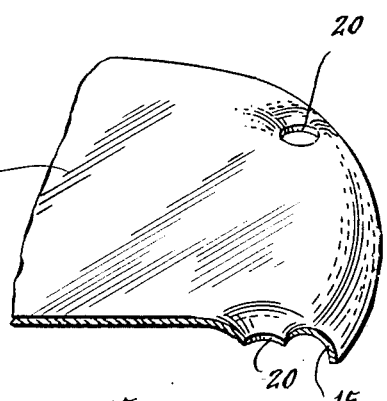
FIG. 7 is a partial perspective view of a modified rack which does not include the microporous surface. It includes depressions around the apertures.

Modifications of my invention are possible. For example, the apertures 19 can be omitted, as shown in FIG. 7, and the apertures 20 be located in depressions in the surface 17, allowing the cooking juices to flow more easily through apertures 20.

I claim:

1. A microwave cooking utensil useful for assuring destruction of harmful bacteria occurring in cooking liquids during the cooking of poultry in a microwave oven, said utensil including:
   an outer container made of microwave reflective material,
   a microwave transmissive steam-confining cover enclosing said outer container,
   a rack for supporting, essentially in contact thereon, a chicken or other food product, said rack being made of heat-conductive, microwave-reflective material, means for supporting said rack above the bottom surface of said container with the upper surface of said rack being spaced above said bottom surface, said rack and said bottom surface defining a chamber for said cooking liquids,
   a set of apertures in said upper surface, each aperture in said set being large enough to permit the passage of microwave energy therethrough, said set of apertures having a total area large enough to permit passage therethrough, during a normal poultry cooking cycle, of sufficient microwave energy to pasteurize said harmful bacteria present in said cooking liquids, and small enough so that the microwave energy passing therethrough is not great enough to prevent condensation of said cooking liquids within said chamber,
   whereby the user is protected from the threat of bacterial ingestion and infection from said cook liquids.

2. A microwave cooking utensil as set forth in claim 1 in which the apertures of said set are proximate to the periphery of said upper surface and near the ends thereof.

3. A microwave cooking utensil useful for assuring destruction of harmful bacteria occurring in cooking liquids during the cooking of poultry in a microwave oven, said utensil including:
   an outer container made of microwave reflective material,
   a microwave transmissive steam-confining cover enclosing said outer container,
   a rack for supporting, essentially in contact thereon, a chicken or other food product, said rack being made of heat-conductive said rack above the bottom surface of said container with the upper surface of said rack being spaced above said bottom surface, said rack and said bottom surface defining a chamber for said cooking liquids,
   a set of apertures in said upper surface, each aperture in said set being large enough to permit the passage of microwave energy therethrough, said set having a total area large enough to permit passage therethrough, during a normal poultry cooking cycle, of sufficient microwave energy to pasteurize said harmful bacterial present in said cooking liquids,
   whereby the user is protected from the threat of bacterial ingestion and infection from said cooking liquids.

4. A microwave cooking utensil as set forth in claim 3 in which said harmful bacteria is Salmonella bacteria and in which said set has six apertures, each with a diameter of about ¾ inch, for a total area of about 2.65 square inches.

5. A microwave cooking utensil as set forth in claim 3 in which said upper surface is depressed in the vicinity of said apertures, whereby said cooking liquids are better enabled to drain through said apertures.

6. A microwave cooking utensil as set forth in claim 3 in which said set of apertures are tune.

7. A microwave cooking utensil for assuring destruction of Salmonella bacteria occurring in cooking liquids during the microwave cooking of poultry, said utensil including:
   an outer container made of microwave reflective material,
   a microwave transmissive steam-confining cover enclosing said outer container,
   a rack for supporting said poultry, said rack being made of heat-conductive, microwave-reflective material, means for supporting said rack above the bottom surface of said container with the upper surface of said rack being spaced above said bottom surface, said rack and said bottom surface defining a chamber for collection of said cooking liquids,
   a set of one or more apertures in said upper surface proximate to the periphery thereof, each aperture in said set being large enough to permit the passage of microwave energy and said cooking liquids therethrough, said set having a total area large enough to permit passage therethrough, during a normal poultry cooking cycle, of sufficient microwave energy to pasteurize any Salmonella bacteria present in said cooking liquids, and
   a second set of apertures in said upper surface, said second set of apertures being large enough to permit the passage of said cooking liquids and small enough to be substantially impermeable to microwave energy,
   whereby said cooking liquids may more readily enter said chamber and the user is protected from threat of Salmonella infection from said cooking liquids.

8. A microwave cooking utensil for assuring destruction of Salmonella bacteria occurring in cooking liquids during the microwave cooking of poultry, said utensil including:
   an outer container made of microwave reflective material,
   a microwave transmissive steam-confining cover enclosing said outer container,
   a rack for supporting said poultry, said rack being made of heat-conductive, microwave-reflective material, means for supporting said rack above the bottom surface of said container with the upper surface of said rack being spaced above said bottom surface, said rack and said bottom surface defining a chamber for collection of said cooking liquids, and
   a set of one or more apertures in said upper surface proximate to the periphery thereof, each aperture in said set being large enough to permit the passage of microwave energy and said cooking liquids therethrough, said set having a total area large enough to permit passage therethrough, during a normal poultry cooking cycle, of sufficient microwave energy to pasteurize any Salmonella bacteria present in said cooking liquids, whereby the user is protected from threat of Salmonella infection from said cooking liquids.

9. A microwave cooking utensil as set forth in claim 8, in which said set of apertures has an area large enough to heat said cooking liquids to at least 140? F. for at least 3.5 minutes during said poultry cooking cycle.

10. A microwave cooking utensil as set forth in claim 8 in which said set of apertures has a total area small enough so that microwave energy passing therethrough is not great enough to prevent condensation of steam within said chamber.

11. A microwave cooking utensil as set forth in claim 8 in which said total area of said set of apertures is about 2.65 square inches.

12. A microwave cooking utensil as set forth in claim 11 in which said set of apertures has six apertures, each with a diameter of about ¾ inch.

13. A microwave cooking utensil as set forth in claim 8 in which said means for supporting said rack is a downwardly depending flange about the entire periphery of said rack.

14. A microwave cooking utensil as set forth in claim 8 in which the size and shape of said rack is substantially coextensive with the size and shape of said bottom surface.

15. A microwave cooking utensil as set forth in claim 8 in including means for electrically and thermally insulating said rack from said container.

16. A microwave cooking utensil as set forth in claim 15 in which said insulating means is a porcelain coating on the inner surface of said container.

17. A microwave cooking utensil as set forth in claim 8 in which said rack is electrically and thermally insulated from said container by a porcelain coating on said downwardly depending flange.

18. A microwave cooking utensil as set forth in claim 8 in which said set of apertures is tuned.

19. A rack structure for supporting poultry in a microwave reflective container having sides and a bottom, said rack structure being adapted to kill Salmonella organisms, said rack structure being made of microwave reflective material and including a surface for holding said poultry in said container, said surface being shaped and dimensioned to cover substantially the entire said bottom of said container, a downwardly depending flange about the entire periphery of said surface for supporting said surface above said bottom to thereby define a substantially closed chamber between said bottom and said surface to receive cooking liquids and steam from poultry being cooked, a set of apertures in said surface, said set of apertures being large enough to permit the passage therethrough an into said chamber of microwave energy, said set having a total area large enough to permit passage of sufficient microwave energy, during a normal cooking cycle, to pasteurize Salmonella bacteria present in said cooking liquids, said set of apertures being positioned proximate to the periphery of said surface and said apertures and having a total area of about 2.65 square inches.

* * * * *